United States Patent
Aoki et al.

(10) Patent No.: US 11,819,885 B2
(45) Date of Patent: Nov. 21, 2023

(54) METHOD FOR PROCESSING ELECTRONIC/ELECTRICAL DEVICE COMPONENT SCRAPS

(71) Applicant: JX Nippon Mining & Metals Corporation, Tokyo (JP)

(72) Inventors: Katsushi Aoki, Hitachi (JP); Hidetoshi Sasaoka, Kitaibaraki (JP)

(73) Assignee: JX METALS CORPORATION, Tokyo (JP)

( * ) Notice: Subject to any disclaimer, the term of this patent is extended or adjusted under 35 U.S.C. 154(b) by 129 days.

(21) Appl. No.: 17/598,949

(22) PCT Filed: Mar. 27, 2020

(86) PCT No.: PCT/JP2020/014366
§ 371 (c)(1),
(2) Date: Sep. 28, 2021

(87) PCT Pub. No.: WO2020/203917
PCT Pub. Date: Oct. 8, 2020

(65) Prior Publication Data
US 2022/0176412 A1 Jun. 9, 2022

(30) Foreign Application Priority Data

Mar. 29, 2019 (JP) .................................. 2019-069381

(51) Int. Cl.
*B07B 9/00* (2006.01)
*B03C 1/23* (2006.01)
(Continued)

(52) U.S. Cl.
CPC .................. *B07B 9/00* (2013.01); *B03C 1/23* (2013.01); *B07B 4/08* (2013.01); *B09B 3/35* (2022.01);
(Continued)

(58) Field of Classification Search
CPC .... B07B 9/00; B07B 4/08; B07B 1/12; B07B 4/02; B07B 7/01; B07B 9/02;
(Continued)

(56) References Cited

U.S. PATENT DOCUMENTS 6,685,116 B1 * 2/2004 Hisazumi ................ B03B 9/061
241/19

FOREIGN PATENT DOCUMENTS

CN        107081212 A   *   8/2017
CN        108580042 A   *   9/2018
(Continued)

OTHER PUBLICATIONS

Extended European Search Report for corresponding European Application No. 20783048.0, dated Nov. 29, 2022.
(Continued)

*Primary Examiner* — Gene O Crawford
*Assistant Examiner* — Muhammad Awais
(74) *Attorney, Agent, or Firm* — Birch, Stewart, Kolasch & Birch, LLP

(57) ABSTRACT

Provided is a method for processing electronic and electrical device component scraps, which can selectively recover a substrate scrap including a substance intended to be recovered. A method for processing electronic and electrical device component scraps, including separating a substrate with lead wires contained in the electronic and electrical device component scraps before sorting the electronic and electrical device component scraps by magnetic sorting.

5 Claims, 7 Drawing Sheets

(51) Int. Cl.
  *B09B 3/35* (2022.01)
  *B07B 4/08* (2006.01)
  *B09B 101/17* (2022.01)
(52) U.S. Cl.
  CPC ....... *B03C 2201/20* (2013.01); *B09B 2101/17* (2022.01)
(58) Field of Classification Search
  CPC ....... B07B 13/04; B03C 1/23; B03C 2201/20; B03C 1/30; B03C 1/02; B03C 1/005; B09B 3/35; B09B 2101/17; B09B 2101/15; B09B 3/00; B09B 5/00; B03B 9/061; B29B 2017/0241; B29B 2017/0272; B29B 2017/0488; B29B 17/02; B29B 17/04; Y02P 10/20
  USPC .......................................................... 209/39
  See application file for complete search history.

(56) References Cited

FOREIGN PATENT DOCUMENTS

| JP | 5-146703 A | | 6/1993 |
| JP | H05146703 A | * | 6/1993 |
| JP | 2001-225020 A | | 8/2001 |
| JP | 2001225020 A | * | 8/2001 |
| JP | 2002-59082 A | | 2/2002 |
| JP | 2002059082 A | * | 2/2002 |
| JP | 2003-320311 A | | 11/2003 |
| JP | 2003320311 A | * | 11/2003 |
| JP | 2008-23938 A | | 2/2008 |
| JP | 2008023938 A | * | 2/2008 |
| JP | 2018-118223 A | | 8/2018 |
| JP | 2018118223 A | * | 8/2018 |
| KR | 20030006792 A | * | 1/2003 |
| KR | 200454419 Y1 | * | 7/2011 |
| KR | 20170044962 A | * | 4/2017 |
| KR | 101779126 B1 | * | 9/2017 |

OTHER PUBLICATIONS

International Search Report, issued in PCT/JP2020/014366, dated Jun. 16, 2020.
International Preliminary Report on Patentability and English translation of the Written Opinion of the International Searching Authority (Forms PCT/IB/338, PCT/IB/373, and PCT/ISA/237) for International Application No. PCT/JP2020/014366, dated Oct. 14, 2021.

* cited by examiner

METHOD FOR PROCESSING ELECTRONIC/ELECTRICAL DEVICE COMPONENT SCRAPS

FIELD OF THE INVENTION

The present invention relates to a method for processing electronic and electrical device component scraps. More particularly, it relates to a method for processing electronic and electrical device component scraps suitable for recycling of used electronic and electrical devices.

BACKGROUND OF THE INVENTION

From the viewpoint of recent resource conservation, recovery of variable metals from electronic and electrical device component scraps such as waste electronic home appliances, PCs and mobile phones has increasingly become popular, and an efficient method for recovering the valuable metals has been studied and proposed.

Among the valuable metals contained in the electronic and electrical device component scraps, iron is a substance which is contained in relatively large amounts in the electronic and electrical device component scraps and is used for applications such as housings, frames, and parts support materials. It is known that a method for performing physical sorting using magnetic sorting is effective as a method of separating and recovering the iron. The magnetic sorting is often used in the early stages of sorting because removing the iron content which is contained in relatively large amounts in the electronic and electrical device component scraps makes it possible to reduce the amount handled in the subsequent processing steps.

In addition to iron, plastic is also a substance that is largely contained in the electronic and electrical device component scraps. Since plastic is effective in reducing weight, many small household appliances have a housing made of plastic, which accounts for a large proportion of scraps of electronic and electrical equipment parts. For this reason, it is also effective to remove the plastic first, and it is also known as an effective means to perform wind power sorting before the magnetic sorting to improve the sorting property (see, for example, Patent Literatures 1 and 2).

CITATION LIST

Patent Literatures

[Patent Literature 1] Japanese Patent Application Publication No. 2002-059082 A
[Patent Literature 2] Japanese Patent Application Publication No. 2003-320311 A

SUMMARY OF THE INVENTION

Technical Problem

On the other hand, many substrate scraps are also included in the electronic and electrical device component scraps. The substrate scraps include a circuit made of copper foil or copper plating and they are important component wastes as a raw material for copper recovery. However, the substrate scraps are often collected on unintended side in collection by a sorter since the substrate scraps contain various substances such as iron and plastic in addition to copper. Accordingly, it is very difficult to selectively recover the substrate scraps including a substance intended to be recovered.

In view of the above problems, the present invention provides a method for processing electronic and electrical device component scraps, which can selectively recover a substrate scrap including a substance intended to be recovered.

Solution to Problem

As a result of intensive studies to solve the above problems, the present inventors have found that among various substrate scraps obtained by coarsely crushing the electronic and electrical device component scraps, the valuable metal contained in the substrate scraps are lost because the substrate with lead wires to which the lead wires are attached is recovered to a magnetic material side by the magnetic sorting.

In one aspect, the present invention completed on the basis of the above findings provide a method for processing electronic and electrical device component scraps, encompassing separating a substrate with lead wires contained in the electronic and electrical device component scraps before sorting the electronic and electrical device component scraps by magnetic sorting.

Advantageous Effects of Invention

According to the present invention, it is possible to provide a method for processing electronic and electrical device component scraps, which can selectively recover a substrate scrap including a substance intended to be recovered.

DETAILED DESCRIPTION OF THE INVENTION

Figure 1:
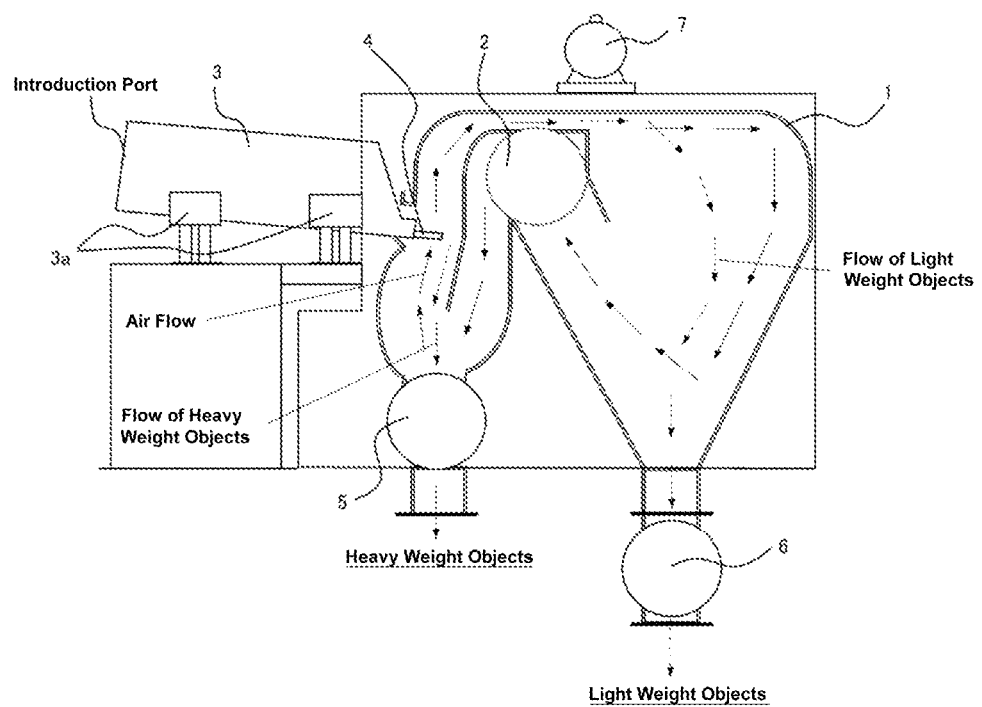
FIG. 1 is a cross-sectional view showing an example of a wind power sorter suitable for recovering a substrate with lead wires according to an embodiment of the present invention.

As used herein, the "electronic and electrical device component scraps" refers to scraps obtained by crushing electronic and electrical devices such as waste home electric appliances, PCs, and mobile phones, recovering them and then crushing them to have an appropriate size. In the present embodiment, the crushing for obtaining the electronic and electrical device component scraps may be performed by an operator. Crushed objects may be also purchased on the market.

As for a crushing method, it is desirable to crush the components without damaging their shapes as much as possible. For example, it is preferable to use a shear type crusher using a shear method or a hammer type crusher using an impact method. On the other hand, any apparatus belonging to the category of a crusher for the purpose of fine crashing is not included in the crushing process according to the present embodiment.

The electronic and electrical device component scraps may be preferably crushed to have a maximum diameter of 100 mm or less, or even 50 mm or less, and a characteristic particle diameter of from 4 to 70 mm or from 4 to 50 mm. The "characteristic particle diameter" refers to an average value determined by extracting arbitrary 100 pieces from the electronic and electrical device component scraps, calculating an average value of long diameters of the electronic and electrical device component scraps, and repeating these procedures five times to average the five average values.

The electronic and electrical device component scraps may be preferably separated into individual components in the form of substrate scrap, wire scrap, parts such as ICs and connectors, metals, and synthetic resins (plastics) used for casings and the like, by coarse crushing in advance. This can provide easy sorting of particular individual components in the subsequent processing, thereby improving a sorting efficiency.

In the present embodiment, the "substrate scrap" is a scrap obtained as a result of a separation (single separation) of a printed wiring board and mounted electronic and electrical components by using the coarse crushing of a printed circuit board which mounts electronic and electrical components (a printed wiring board in which electronic components are soldered so as to operate as an electronic circuit). The printed wiring board refers to a board in which a conductor is provided on or inside the board made of an insulator and in a state before electronic components are attached. Through the coarse crushing process, the substrate scraps in the electronic and electrical device component scraps are mainly classified into three classes: 1) substrates with lead wires and components; 2) substrates with lead wires; and 3) substrates with no lead wire. When the electronic and electrical device component scraps are crushed using a shear type crusher, the substrates with lead wires and components and the substrates with lead wires are mainly obtained. When the electronic and electrical device component scraps are crushed by using a hammer type crusher, the substrates with no lead wire are mainly obtained.

Mounted components such as integrated circuits (ICs), resistors, capacitors and transistors are fixed on a printed wiring board. Among these components, some of the lead wires and solder may remain on the board when separated from the board because some parts are fixed with lead wires and solder. In the present embodiment, a substrate including such lead wires and components is defined as a "substrate with lead wires and components". The substrate with lead wires and components is a substrate to which metal parts such as iron and aluminum are attached in addition to the lead wires. There is a high possibility that a loss of valuable metal will occur when the substrates with lead wires and components are supplied to the magnetic sorting and distributed to the magnetic material (Fe scrap) side. For this reason, it is desirable to crush the substrate with lead wires and components again to further separate the parts adhering to the substrate. In addition, a substrate on which the printed wiring board and the mounted electronic components are not separated is classified into the "substrate with lead wires and components". The "substrate scrap" refers to a generic term of the "substrate with lead wires and components"; the "substrate with lead wires"; and the "substrate with no lead wire".

The substrate with no lead wire refers to a substrate which does not contain any lead wire, component or the like. The substrate with no lead wire can be sorted by the similar sorting process as synthetic resins which are used for the housing and the like.

The substrate with lead wires refers to a substrate which includes lead wire. It is difficult to sort the substrates because they contain various substances such as iron, plastic and the like. This substrate with lead wires may be very useful material as a recovery target by selectively separating and recovering the substrate with lead wires and using it as a raw material to be put into the smelting process to improve the recovery rate of copper. However, like the substrate with lead wires and components, this substrate with lead wires is supplied to the magnetic sorting process as it is, it will be distributed to the magnetic material (Fe scrap) side because the substrate with lead wires also contains lead wires made from irons and the like.

In accordance with an embodiment of a method for processing electronic and electrical device component scraps, the method includes selectively separating and recovering a substrate with lead wires contained in the electronic and electrical device component scraps before the magnetic sorting process. The process of selectively separating and recovering the substrate with lead wires may be performed before or immediately before the magnetic sorting process. For example, if it is before the magnetic sorting is performed, the process of separating substrates with lead wires by performing the wind power sorting at any stage to obtain processing materials by coarsely crushing the above-described waste electric home appliances, PCs and mobile phones, and other electronic and electrical equipment that is used as raw materials for the electronic and electrical device component scraps can also be included in the present embodiment.

The process of separating substrates with lead wires contained in the electronic and electrical equipment component scraps is preferable to separate substrates with lead wires so that the substrate with lead wires contained in the objects to be processed that are supplied to the process of magnetic sorting is 10 mass % or less, or even 7 mass % or less, or even 5 mass % or less, or even 1 mass % or less. This prevents the substrate with lead wires from being mixed into the magnetic material side even when magnetic sorting is subsequently performed, thereby increasing the recovery efficiency of valuable metals in the smelting process.

Wind power sorting, color sensors, metal sorters, and other camera-based sorting may be effective methods for separating and recovering substrates with lead wires contained in the electronic and electrical equipment component scraps. In particular, wind sorting can be used to efficiently and simply separate and recover the substrates with lead wires.

In order to send the substrates with lead wires contained in the electronic and electrical equipment component scraps to a lightweight side more efficiently in the wind power sorting, it is generally desirable to increase a wind velocity of the wind power sorting by 10 to 20% or even 12 to 18% of the wind velocity at which plastics can be separated.

However, since some lead wires and solder remain on the board with lead wires, it may be difficult to efficiently sort them into lightweight materials depending on the shape and specific gravity of the substrate with lead wires. For example, if the wind velocity is too high, other component scraps, such as aluminum foils, are further mixed in with the lightweight materials, which is not desirable. Therefore, it is preferable to examine the state (shape and size) of aluminum in the electronic and electrical equipment component scraps, and then readjust conditions individually to an appropriate wind velocity such that substrates with lead wires are removed as the lightweight materials.

Specifically, as a processing condition for the wind power sorting, the wind velocity may be preferably 15 m/s or higher, more preferably 16 m/s or higher, and even more preferably 16.5 m/s or higher. On the other hand, if the wind velocity is too high, it may not be economical and may not be able to efficiently remove the substrates with lead wires. Therefore, it is preferable to set the wind velocity to 20 m/s or less, and more preferably 19 m/s or less, and even more preferably 18 m/s or less.

The wind power sorting can be carried out in at least two stages. For example, the wind power sorting can be a combination of a first wind power sorting process of previously separating powdery objects and film-shaped objects that will be adversely affected on discriminability of a camera of a sorter such as a color sorter and a metal sorter using a camera or the like used in the physical sorting, with a second wind power sorting process of concentrating the plate-shaped objects containing valuable metals to the light weight object side and separating metals including Fe, Al, and the like to the heavy weight object side. The first wind power sorting process can be carried out, for example, at a wind velocity of 5 to 8 m/s, and preferably 6 to 7 m/s, and the second wind power sorting process can be carried out under the same conditions as described above.

The first wind power sorting process may be carried out immediately before feeding the sorted objects into the sorter that uses the camera to recognize the objects, or prior to the feeding, it may be combined with any sorting stage. For example, the first wind powder sorting can be combined with at least one of magnetic sorting, sieving, or color sorting processes that take place after the wind power sorting.

Although it is related to the contents of the substrates with lead wires in the raw material, the percentage of the substrates with lead wires distributed to the light weight object side by the wind power sorting can be 95% or more, 97% or more, or even 99% or more. The substrates with lead wires distributed to the light weight object side can be fed to the smelting step to recover valuable metals such as copper contained in the substrates with lead wires.

Each of FIGS. 1 to 5 shows an example of a wind power sorter suitable for the embodiment according to present invention. The wind power sorter includes: a diffusion chamber 1; a blower 2 for generating an air flow in the diffusion chamber 1; a feed portion 3 for feeding sorting objects including plate-shaped objects including the substrates with lead wires 10 into the diffusion chamber 1; a guide portion 4 extending into the diffusion chamber 1 from a terminal of the feed portion 3 on the diffusion chamber 1 side; a heavy weight object collecting portion 5 provided below the feed portion 3 in the diffusion chamber 1; and a light weight object collecting portion 6 provided below the diffusion chamber 1 on a deep side in a feeding direction of the sorting objects. Provided on an upper portion of the diffusion chamber is a blower motor 7 for circulating the air inside the diffusion chamber.

In the diffusion chamber 1, an air flow indicated by the solid arrows as shown in FIG. 1 is generated by the air blown from the blower 2. In the wind power sorter as shown in FIG. 1, a diagonally downward air flow directed from the blower 2 to the heavy weight object collecting portion 5 is formed, an upward air flow directed from the heavy weight object collecting portion 5 to the upper portion of the guide portion 4 is formed, a horizontal air flow directed from a feed port to the feeding direction on an upper part of the diffusion chamber 1 is formed, and a downward air flow directed from the upper portion of the diffusion chamber 1 to the light weight object collecting portion 6 is formed.

FIG. 1 shows an example in which the blower 2 is disposed near the central portion of the diffusion chamber. However, the present invention is not limited to the example as shown in FIG. 1, and may be any embodiment where the sorting objects fed to the upper portion of the guide portion 4 can be brought into contact with the upward air flow to sort the heavy weight objects and light weight objects in the sorting objects by wind power.

The sorting objects are fed from an introduction port of the feed portion 3 and fed to the guide portion 4 protruding into the diffusion chamber 1 while being vibrated by a vibrating member 3a. The sorting objects in the guide portion 4 are brought into contact with the upward air flow from below the guide portion 4. The air flow blows up the light weight objects above the guide portion 4 to diffuse them into the diffusion chamber 1, and the light weight objects falls to the light weight object collecting portion 6 side on the deep side in the feeding direction. The heavy weight objects having a gravity larger than that of the wind force of the upward air flow fed to the guide portion 4 falls below the guide portion 4 and are collected by the heavy weight object collecting portion 5. The dotted arrows in FIG. 1 indicate the flows of the heavy and light weight objects, respectively.

Figure 2:
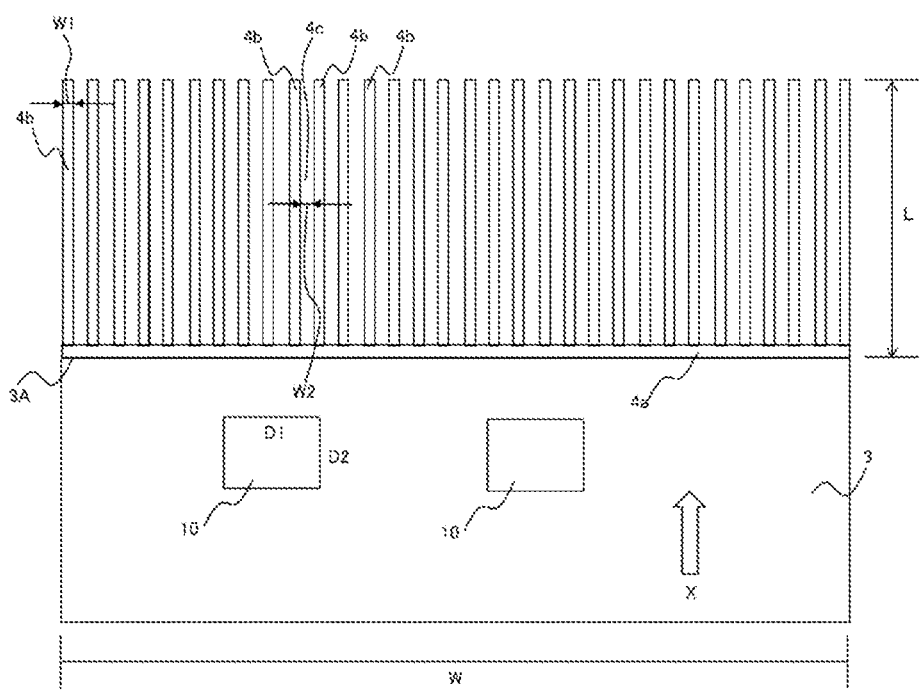
FIG. 2 is a plane view of a wind power sorter around a guide portion.

As shown in FIG. 2, the guide portion 4 has a comb shape, and includes: a base portion 4a connected to a terminal 3A of the feed portion 3 by welding or screwing, and a plurality of protruding portions 4b each protruding from the base portion 4a connected to the terminal 3A side of the feed portion 3 to the interior of the diffusion chamber 1. Each of the protruding portions 4b is formed such that its thickness (width) W1 becomes uniform from the terminal 3A side of the feed portion 3 to a feeding direction X. It is desirable that the substrates with lead wires come into contact with the air flow as much as possible from a time when the tips of the plate-shaped objects fly out from the terminal 3A side of the feed portion 3. Therefore, it is desirable that the protruding portions have a uniform thickness.

Among the respective protruding portions 4b, spaces 4c are provided, respectively, for bringing the air flow passing through the guide portion 4 into contact with the sorting objects, and a width W2 of each space 4c is formed to be uniform from the end 3A side of the feed portion 3 to the feeding direction X. Such a shape enables a larger amount of air flow to be applied to the sorting objects and more uniform air flow to be brought into contact with the sorting objects, so that they can be more easily pushed upward regardless of the type of light weight objects.

Figure 3:
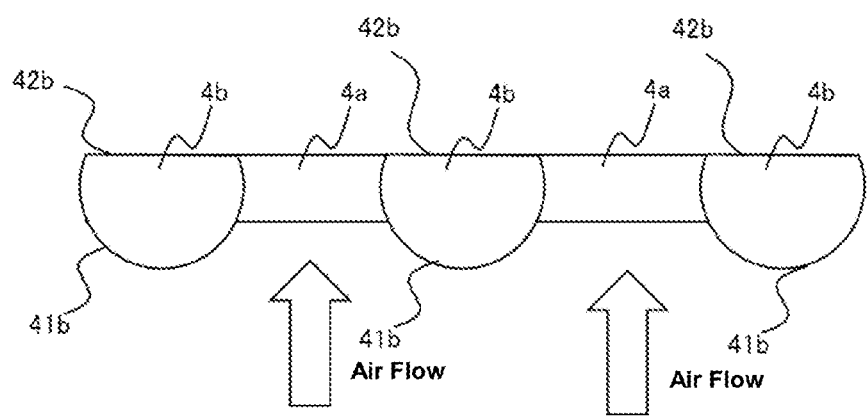
FIG. 3 is a plane view of a guide portion as viewed from a diffusion chamber side.

As shown in FIG. 3, it is preferable that at least a lower surface 41b of each protruding portion 4b has a curved surface. This can lead to lower air resistance of the guide portion 4 to the upward air flow flowing from below the guide portion 4, and an improved sorting efficiency of plate-shaped objects including the substrates with lead wires 10 according to the embodiment. In the example as shown in FIG. 3, the lower surface 41b of each protruding portion 4b has a curved surface, and an upper surface 42b of each protruding portion 4b, which is contacted with the sorting objects, has a flat surface. Such a shape can provide smooth feeding of the sorting objects on the upper surfaces 42b of the protruding portions 4b without being caught therein, and also reduce a contact resistance of each protruding portion 4b with the upward air flow flowing from the upper part to the lower part of each protrusion 4b, so that the air flow can be more efficiently brought into contact with the plate-shaped objects including the substrates with lead wires 10 according to the present embodiment. In addition to the example as shown in FIG. 3, each protruding portion 4b may have, for example, a rod shape in which both the upper surface 42b and the lower surface 41b have curved surfaces. Each protruding portion may also have an inverted triangular shape for the purpose of being able to be smoothly provided and be efficiently contacted with the air flow.

A thickness W1 of each protrusion 4b and a width W2 of each space are preferably set to be lower than an average diameter D2 of short diameters of the plate-shaped objects including the substrates with lead wires 10 such that the plate-shaped objects including the substrates with lead wires 10, the sorting objects, do not fall out of the guide portion 4.

A length L (see FIG. 2) of the guide portion 4 from the terminal 3A side of the feed portion 3 to the tip side of the diffusion chamber 1 is preferably more than or equal to half, more preferably more than or equal to ⅔, of the average diameter D1 or D2, preferably the average diameter D1 of the long diameters, of the plate-shaped objects including the substrates with lead wires 10 which are the sorting objects. A width W of the guide portion 4 can be the same as the width of the feed portion 3.

The length L of the guide portion 4 of more than or equal to half of the average diameter D1 or D2 of the plate-shaped objects including the substrates with lead wires 10, preferably more than or equal to half of the average diameter D1 of the long diameters, can allow the upward flow from the lower part of the guide portion 4 to be sufficiently contacted with the plate-shaped objects including the substrates with lead wires 10, so that the plate-shaped objects including the substrates with lead wires 10 can be allowed to flow up to the upper part of the guide portion 4 more reliably to diffuse them to the light weight object collecting portion 6. If the length L is too long, the heavy weight objects such as metals that are desired to be transferred to the heavy weight object side may clog the spaces 4c, the length L is less than or equal to twice the average diameter D1 of the long diameters of the plate-shaped objects.

Each of the average diameters D1 and D2 of the plate-shaped objects including the substrates with lead wires 10 is determined by extracting arbitrary 10 pieces of the plate-shaped objects including the substrates with lead wires 10 in the sorting objects and calculating average diameters of the long and short diameters of the ten extracted pieces. The procedures are repeated five times and an average value thereof is reported.

Specifically, a thickness W1 of each protruding portion 4b may be from 1 to 10 mm, and more preferably from 2 to 5 mm, and a width W2 of each space 4c may be from 1 to 20 mm, and preferably from 2 to 5 mm, and a length L of the guide portion 4 may be from 25 to 100 mm, and preferably from 40 to 70 mm, although not limited thereto.

Figure 4:
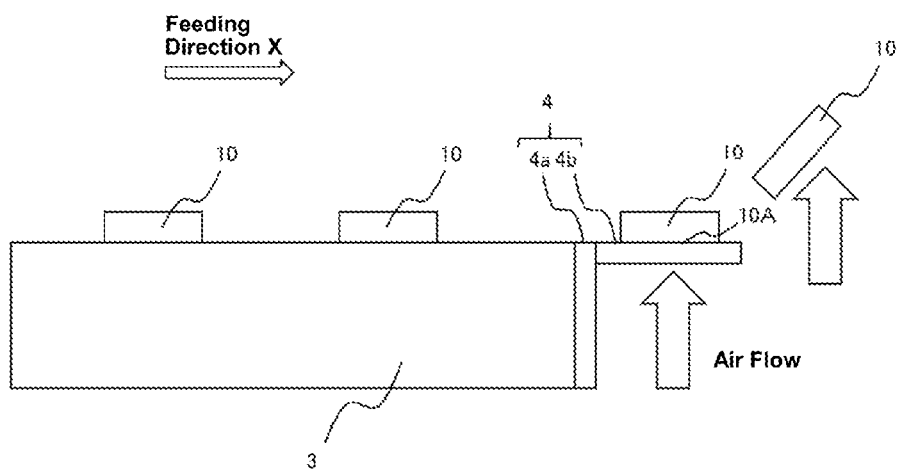
FIG. 4 is a side view of a wind power sorter around a guide portion.

As shown in FIG. 4, the guide portion 4 is arranged such that the air flow which flows from below the guide portion 4 in the upward direction is brought into contact with the lower surface 10A of the plate-shaped object including the substrates with lead wires 10 placed on the protruding portions 4b of the guide portion 4 in a perpendicular direction to the lower surface 10A of the plate-shaped object 10.

By arranging the guide portion 4 such that the air flow is brought into contact with the lower surface 10A of the plate-shaped object including the substrates with lead wires 10 in the perpendicular direction to the lower surface 10A, the force exerted by the upward flow of the air flow against the plate-shaped objects including the substrates with lead wires 10 can be maximized, so that the air resistance can be adjusted uniformly and maximally along the feed direction of the guide portion 4.

Figure 5:
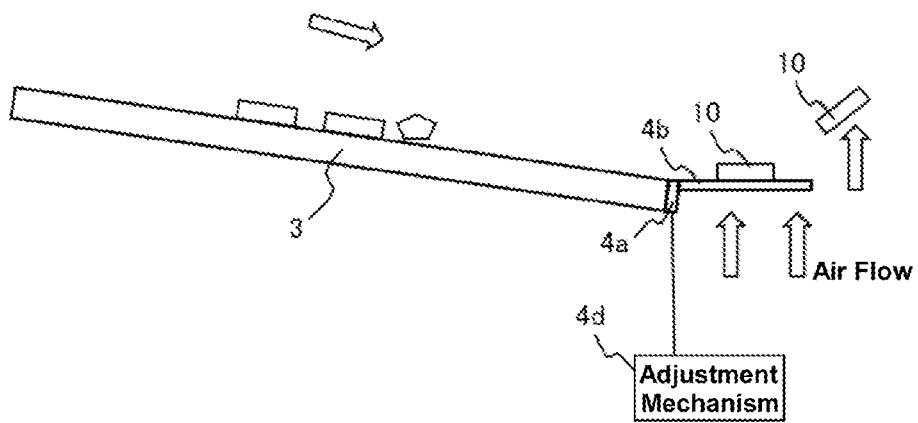
FIG. 5 is a side view of a wind power sorter around a guide portion.

As shown in FIG. 5, the wind power sorter may be provided with an adjustment mechanism 4d for adjusting an angle of the guide portion 4 such that the air flow is brought into contact with the lower surfaces of the plate-shaped objects including the substrates with lead wires 10 in the vertical direction to the lower surfaces. This can allow the air flow flowing from below the guide portion 4 to the upward direction to be brought into contact with the lower surfaces 10A of the plate-shaped objects including the substrates with lead wires 10 in the perpendicular direction to the lower surfaces 10A even if the feed portion 3 has an inclination.

The heavy weight object collecting portion 5 and the light weight object collecting portion 6 can be composed of a generally available discharge rotor or the like, and their specific configurations are not limited. Further, the plate-shaped objects including the substrates with lead wires 10 can be more efficiently sorted from the electronic and electric device component scrap by bringing the air blown from the blower 2 at a wind velocity of 15 m/s or more into contact with the lower surfaces 10A of the plate-shaped objects including the substrates with lead wires 10.

According to the wind power sorting device as shown in FIG. 1 and the wind power sorting method using the same, the provision of the guide portion 4 enables the air flow to be efficiently brought into contact with the plate-shaped objects including the substrates with lead wires 10 in the electronic and electrical equipment scrap, which are the sorting objects. This can allow the plate-shaped objects including the substrates with lead wires 10 having air resistance significantly varied depending on the direction exposed to the wind, to be more efficiently sorted to the light weight object side (in the light weight object collecting portion 6).

Figure 6:
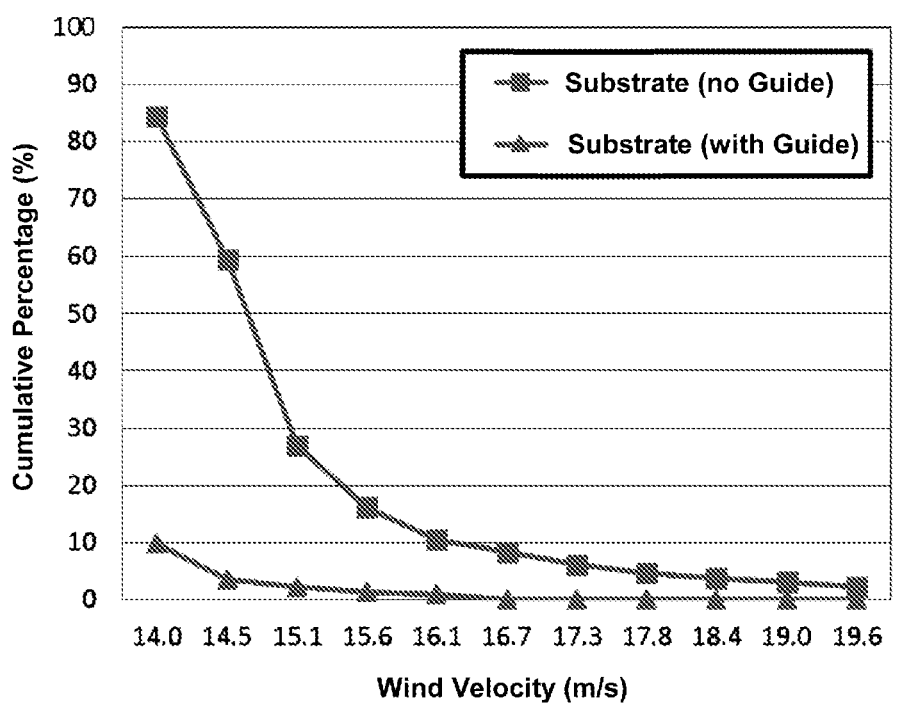
FIG. 6 is a graph showing a change in a ratio of distribution of substrates with wire leads to a heavy weight object side when a wind velocity is changed in cases where a wind power sorter having a guide portion (with guide) and a wind power sorter having no guide portion (no guide) are used.
Figure 7:
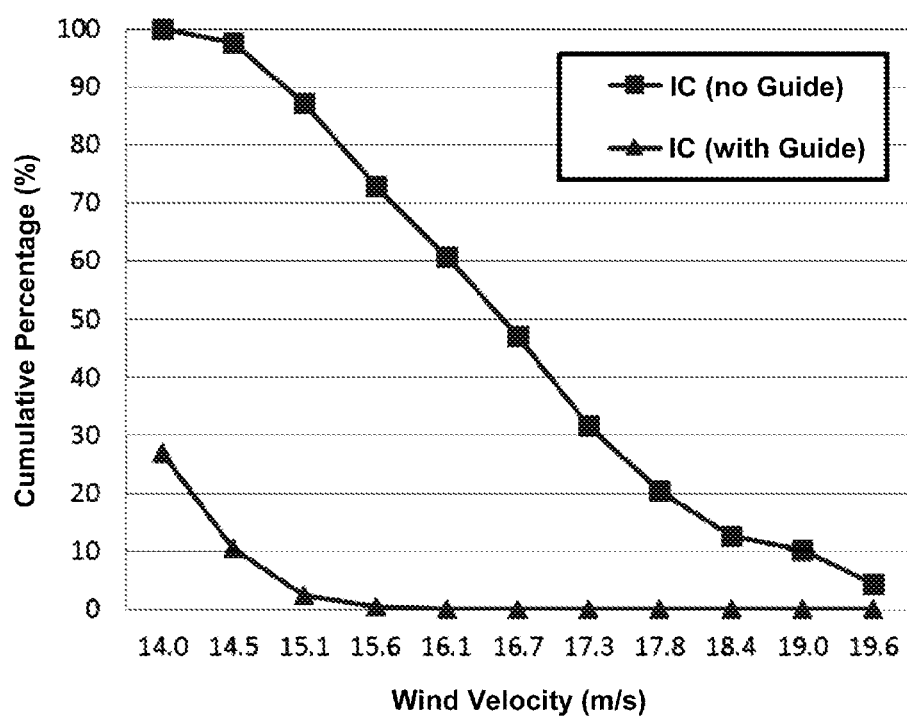
FIG. 7 is a graph showing a change in a ratio of distribution of flat plate-shaped ICs to a heavy object side when a wind velocity is changed in cases where a wind power sorter having a guide portion (with guide) and a wind power sorter having no guide portion (no guide) are used.

FIG. 6 and FIG. 7 show transitions of distribution rates of the substrates and flat plate-shaped ICs as the plate-shaped objects containing valuable metals to the heavy weight object side in cases where the wind power sorter having the guide portion 4 (with guide) is used, and a conventional wind power sorter having no guide portion 4 (no guide) is used to change the wind velocities to sort the electronic and electrical device component scraps.

As shown in FIG. 6, in the case where the wind power sorting process is carried out at a wind velocity of 15 m/s or more, about 30% of the substrates transfer to the heavy weight object side for the wind power sorter having no guide portion 4, whereas the wind power sorter having the guide portion 4 can significantly reduce the contamination of the substrates that transfer to the heavy weight object side to 3% or less. In the case where the wind power sorter as shown in FIG. 1 is used, the percentage of the substrates contaminated into the heavy weight object side can be further reduced to less than or equal to 1% by increasing the wind velocity to 16 m/s or more, and reduced to substantially 0% at 16.7 m/s or more.

As shown in FIG. 7, in the case where the wind power sorting process is carried out at a wind velocity of 15 m/s or more, about 90% of the substrates transfer to the heavy weight object side for the wind power sorter having no guide portion 4, whereas the wind power sorter having the guide portion 4 can significantly reduce the contamination of the substrates that transfer to the heavy weight object side to 3% or less. In the case where the wind power sorter as shown in FIG. 1 is used, the percentage of the plate-shaped objects including the substrates with lead wires contaminated into the heavy weight object side can be further reduced to less than or equal to 1% by increasing the wind velocity to 15.6 m/s or more, and reduced to substantially 0% at 16.1 m/s or more.

Since the ICs are partially made of iron, they may be distributed to the magnetic object side in the magnetic sorting, which may cause the ICs to be contaminated when sorting Fe in the magnetic sorting to reduce a recovery efficiency of valuable metals. By using the wind power sorting according to the embodiment of the present invention, the flat plate-shaped ICs can be previously removed before magnetic sorting, thereby suppressing the reduction of the recovery efficiency of valuable metals in the magnetic sorting. In general, the maximum diameter of the ICs after the crushing process is often smaller than that of substrates. Therefore, when the wind power sorting is carried out using the wind power sorter having the guide portion 4 in FIG. 1, the larger amounts of ICs can be recovered on the light weight object side, thereby suppressing the contamination in the heavy weight object side. According to tests conducted by the present inventors, a percentage of ICs contaminated in the heavy weight objects was 61% when the guide portion 4 was not provided, whereas the percentage of ICs contaminated in the heavy weight objects was significantly reduced to 0.1% or less when the guide portion 4 was provided.

According to the method for processing electronic and electric device component scrap according to the embodiment of the present invention, prior to magnetic sorting of the electronic and electric device component scrap, the substrates in the electronic and electric device component scrap, in particular, the substrates with lead wires, which would reduce the sorting efficiency of magnetic sorting, can be removed in advance by the wind power sorting process, thereby suppressing the reduction of the sorting efficiency of the magnetic sorting due to the contamination of the substrates with lead wires in Fe scrap or Al scrap, and reducing the losses of valuable metals.

Furthermore, if it is desired to recover Al, for example, by eddy current sorting after magnetic sorting, the substrates contain copper and have higher electrical conductivity. Therefore, a lager crushed particle size will lead to distribution to a repulsive side as with Al in the eddy current sorting. Therefore, the substrates that are contaminated in the non-magnetic object side without being distributed to the magnetic object side in the magnetic sorting may be distributed to the Al scrap in the eddy current sorting. In the present invention, the losses of substrates in the eddy current sorting as well as the magnetic sorting can be reduced by carrying out the wind power sorting process in advance prior to the magnetic sorting and eddy current sorting processes. Therefore, the process of the embodiment can more advantageously exert the effect of reducing the losses of valuable metals, especially when the process has the physical sorting step that carries out the eddy current sorting after magnetic sorting.

The percentage of the substrates distributed in the magnetic materials by the magnetic sorting is preferably 5% or less, and more preferably 3% or less, and even more preferably 1% or less. By decreasing the percentage of the substrates distributed in the magnetic materials by the magnetic sorting as much as possible, the losses of the substrates can be reduced when the eddy current sorting is subsequently carried out.

Thus, the present invention is not limited to each embodiment, and the components may be modified and embodied without departing from the spirit of the present invention. Further, various inventions may be created by appropriately combining the plurality of components disclosed in the present embodiment. For example, some components may be removed from all the components shown in the embodiments, or the components of different embodiments may be optionally combined.

DESCRIPTION OF REFERENCE NUMERALS 1 diffusion chamber
2 blower
3 feed portion
3A terminal
3a vibration member
4 guide portion
4a base portion
4b protruding portion
4c space
4d adjustment mechanism
5 heavy weight object collecting portion
6 light weight object collecting portion
7 exhaust portion
10 plate-shaped object

The invention claimed is:

1. A method for processing electronic and electrical device component scraps, comprising separating a substrate with lead wires contained in the electronic and electrical device component scraps by performing a wind power sorting at a wind velocity between 15 to 20 m/s by using a wind power sorting device which comprises a guide portion provided therein and being arranged such that an airflow which is brought into contact with the substrate with lead wires in a perpendicular direction to a lower surface of the substrate with lead wires, before sorting the electronic and electrical device component scraps by magnetic sorting.

2. The method for processing electronic and electrical device component scraps according to claim 1, wherein the substrate with lead wires contained in the electronic and electrical device component scraps is separated so that the substrate with lead wires contained in objects to be processed supplied to the magnetic sorting is 10% by mass or less.

3. The method for processing electronic and electrical device component scraps according to claim 1, wherein a wind velocity of the wind power sorting is 10 to 20% higher than a wind velocity at which plastics can be separated.

4. The method for processing electronic and electrical device component scraps according to claim 1, wherein the electronic and electrical device component scraps before being subjected to the magnetic sorting are crushed using a shear type crusher or a hammer type crusher.

5. The method for processing electronic and electrical device component scraps according to claim 1, further comprising performing eddy current sorting after the magnetic sorting.

* * * * *